United States Patent

Franchina

(10) Patent No.: US 6,479,605 B1
(45) Date of Patent: Nov. 12, 2002

(54) HIGH-DURABILITY, LOW-YELLOWING REPELLENT FOR TEXTILES

(75) Inventor: Justine Gabrielle Franchina, Hockessin, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 10/091,004

(22) Filed: Mar. 4, 2002

Related U.S. Application Data

(63) Continuation of application No. 09/855,395, filed on May 15, 2001, now abandoned.

(51) Int. Cl.$^7$ .............................................. C08F 118/00
(52) U.S. Cl. ..................... 526/245; 526/255; 526/304; 526/307.3; 526/307.5; 526/307.7; 526/320; 526/323.1; 526/323.2; 526/329.4; 526/329.6; 526/330; 526/333
(58) Field of Search ................................ 526/245, 255, 526/304, 307.3, 307.5, 307.7, 320, 323.1, 323.2, 329.4, 329.6, 330, 333

(56) References Cited

U.S. PATENT DOCUMENTS

| | | |
|---|---|---|
| 3,944,527 A | 3/1976 | McCown |
| 4,127,711 A * | 11/1978 | Lore et al. .................. 526/245 |
| 4,742,140 A | 5/1988 | Greenwood et al. |
| 4,859,754 A | 8/1989 | Maekawa et al. |
| 5,055,538 A | 10/1991 | Amimoto et al. |
| 5,143,991 A | 9/1992 | Amimoto et al. |
| 5,164,252 A | 11/1992 | Henning et al. |
| 5,240,990 A | 8/1993 | Kallfass et al. |
| 5,247,008 A | 9/1993 | Michels et al. |
| 5,387,640 A | 2/1995 | Michels et al. |
| 5,578,688 A | 11/1996 | Ito et al. |
| 5,674,961 A | 10/1997 | Fitzgerald et al. |
| 5,753,569 A | 5/1998 | Michels et al. |
| 5,872,180 A | 2/1999 | Michels et al. |
| 5,929,158 A | 7/1999 | Matsuno et al. |
| 6,180,740 B1 | 1/2001 | Fitzgerald |

FOREIGN PATENT DOCUMENTS

| | | |
|---|---|---|
| DE | 4113893 A | 10/1992 |
| EP | 0 646 196 B1 | 4/1995 |
| EP | 0 898 011 A1 | 2/1999 |
| EP | 0 987 362 A1 | 3/2000 |
| EP | 1 016 700 A1 | 7/2000 |
| JP | 60040182 A | 3/1985 |
| JP | 61019684 A | 1/1986 |
| JP | 4053842 A | 2/1992 |
| JP | 5263070 A | 10/1993 |
| JP | 6017034 A | 1/1994 |
| JP | 6240239 A | 8/1994 |
| JP | 8081883 A | 3/1996 |
| JP | 8283654 A | 10/1996 |

OTHER PUBLICATIONS

Shou–I Chen, Morphology of Perfluoroalkylacrylate/stearyl Methacrylate Polymers andTheir Effect on Water/Oil, *Journal of Applied Polymer Science 63*, No. 7, Feb. 14, 1997, p. 903–909.

* cited by examiner

*Primary Examiner*—Helen L. Pezzuto

(57) ABSTRACT

A copolymer comprising monomers copolymerized in the following percentages by weight:

(a) from about 40% to about 75% of a monomer of formula I:

$$R_f\text{—}CH_2CH_2\text{—}OC(O)\text{—}C(R)\text{=}CH_2 \qquad \text{I}$$

(b) from about 15% to about 55% of a monomer of formula II:

$$R_2\text{—}OC(O)\text{—}C(R)\text{=}CH_2 \qquad \text{II}$$

(c) from 1.5% to about 5% of a monomer of the formula III:

$$HO\text{—}CH_2CH_2\text{—}OC(O)\text{—}C(R)\text{=}CH_2 \qquad \text{III}$$

(d) from 1.5% to about 5% of a monomer of the formula IV:

$$H\text{—}(OCH_2CH_2)_m\text{—}O\text{—}C(O)\text{—}C(R)\text{=}CH_2 \qquad \text{IV}$$

(e) from 1% to about 3% of a monomer of the formula V:

$$HO\text{—}CH_2\text{—}NH\text{—}C(O)\text{—}C(R)\text{=}CH_2 \qquad \text{V}$$

(f) from 0% to about to about 9.8% of vinylidene chloride, vinyl acetate, or a mixture thereof (g) from 0% to about 2% of a blocked isocyanate, wherein $R_f$ is a straight or branched-chain perfluoroalkyl group of from 2 to about 20 carbon atoms, each R is independently H or $CH_3$; $R_2$ is an alkyl chain from 2 to about 18 carbon atoms; and m is 2 to about 10, is disclosed.

11 Claims, No Drawings

HIGH-DURABILITY, LOW-YELLOWING REPELLENT FOR TEXTILES

This application is a continuation of No. 09/855,395, filed on May 15, 2001, now abandoned.

FIELD OF THE INVENTION

This invention relates to an aqueous emulsion composition of a fluorochemical (meth)acrylate copolymer for imparting a highly-durable oil and water repellent finish to textiles, wherein the copolymer imparts little or no yellowing of the textiles upon curing. In all instances herein, the term "(meth)acrylate" is used to denote either acrylate or methacrylate, or mixtures thereof.

BACKGROUND OF THE INVENTION

Fluoropolymer compositions having utility as textile treating agents, generally contain pendant perfluoroalkyl groups of three or more carbon atoms, which provide oil- and water-repellency when the compositions are applied to fabric surfaces. The perfluoroalkyl groups are attached by various connecting groups to polymerizable groups not containing fluorine. The resulting monomer is then generally copolymerized with other monomers which confer additional favorable properties to the textile fabrics. The polymer chain backbone of the resulting copolymer may be (meth) acrylates, vinyl, vinylidene or other groups. They may act to extend the performance of the more expensive perfluoroalkyl groups, or act as bonding agent to fix the copolymer to the fabric, or may serve other functions. Generally, such copolymers are prepared by copolymerization of two or more monomers in an aqueous media stabilized with a surfactant.

These polymers are marketed as aqueous emulsions for easy application to the fabric. The fabric-treating composition may also include other additives in addition to those copolymerized with the fluoromonomer. In particular, various compounds such as blocked isocyanates are frequently added before or after polymerization to promote durability of a desired property such as repellency. In this usage, the blocking agent is removed from the isocyanate under the thermal conditions used when curing the treated fabric, allowing the isocyanate group to interact with the fabric and improve the desired durability.

Typically, the major monomers used for such copolymers include a perfluoroalkyl (meth)acrylate and a long-chain alkyl (meth)acrylate such as stearyl (meth)acrylate. Many such copolymers also contain vinyl or vinylidene chloride in order to improve the durability of the repellency treatment. Smaller amounts of various specialized monomers containing hydroxyl groups and/or alkylene oxide oligomers may be incorporated to impart improved cross-linking, latex stability and/or substantivity. Each ingredient may impart some potentially undesirable properties in addition to its desirable ones.

For example, U.S. Pat. No. 4,742,140 discloses a composition comprising by weight 40–75% of a specific perfluoroalkylethyl acrylate mixture, 10–35% vinylidene chloride and 10–25% alkyl (meth)acrylate having an alkyl chain length of 2–18 carbons. A preferred composition consists essentially of by weight 45–70% of the above perfluoroalkylethyl acrylate, 15–30% vinylidene chloride, 10–20% of the above alkyl (meth)acrylate, 0.1–2% N-methylol acrylamide, and optionally up to 5% chlorohydroxypropyl (meth)acrylate, and up to 5% poly(oxyethylene) (meth) acrylate. Improved repellency and durability are claimed over prior art compositions.

However, polymers containing such large amounts of vinylidene chloride may cause yellowing of the fabric upon curing, due to dehydrohalogenation of the vinylidene chloride. There is a need for compositions which impart a highly durable repellency to fabrics but which contain less than 10% by weight of vinylidene chloride. There is also a need for compositions having durable repellency properties but which require less fluorine to be present. The present invention provides such compositions.

SUMMARY OF THE INVENTION

The present invention comprises a copolymer composition, which imparts a highly durable, low yellowing repellent finish to fabrics and fabric blends comprising monomers copolymerized in the following percentages by weight:

(a) from about 40% to about 75% of a monomer of formula I:

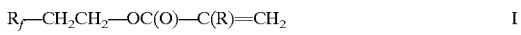
$$R_f-CH_2CH_2-OC(O)-C(R)=CH_2 \qquad I$$

(b) from about 15% to about 55% of a monomer of formula II:

$$R_2-OC(O)-C(R)=CH_2 \qquad II$$

(c) from 1.5% to about 5% of a monomer of the formula III:

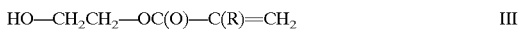
$$HO-CH_2CH_2-OC(O)-C(R)=CH_2 \qquad III$$

(d) from 1.5% to about 5% of a monomer of the formula IV:

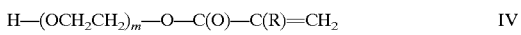
$$H-(OCH_2CH_2)_m-O-C(O)-C(R)=CH_2 \qquad IV$$

(e) from 1% to about 3% of a monomer of the formula V:

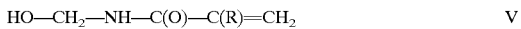
$$HO-CH_2-NH-C(O)-C(R)=CH_2 \qquad V$$

wherein $R_f$ is a straight or branched-chain perfluoroalkyl group of from 2 to about 20 carbon atoms, each R is independently H or $CH_3$; $R_2$ is an alkyl chain from 2 to about 18 carbon atoms; and m is 2 to about 10.

Optionally, the copolymer composition may also contain:

(f) from 0% up to about 9.8% of vinylidene chloride (formula VI) or vinyl acetate (formula VII), or a mixture thereof:

$$CH_2=CCl_2 \qquad VI$$
$$CH_3-(O)COCH=CH_2 \qquad VII$$

(g) from 0% to about 2% of a blocked isocyanate such as the monomer of the formula VIII:

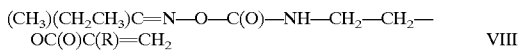
$$(CH_3)(CH_2CH_3)C=N-O-C(O)-NH-CH_2-CH_2-\\OC(O)C(R)=CH_2 \qquad VIII$$

wherein R is H or $CH_3$.

The present invention further comprises a method of treating a fabric or fabric blend to impart oil and water repellency comprising application to the surface of the fabric or fabric blend of the composition as described above, and the fabric or fabric blend which has been so treated. The treated fabric or fabric blend has a fluorine content of from about 0.05% to about 0.5% by weight.

DETAILED DESCRIPTION OF THE INVENTION

Trademarks and tradenames are indicated herein by capitalization. This invention comprises improved fluorochemical copolymers useful for imparting repellent properties to fabrics or blends. By "fabrics" is meant natural or synthetic fabrics composed of fibers of cotton, rayon, silk, wool, polyester, polypropylene, polyolefins, nylon, and aramids such as "NOMEX" and "KEVLAR." By "fabric blends" is meant fabric made of two or more types of fibers. Typically these blends are a combination of a natural fiber and a synthetic fiber, but also can include a blend of two natural fibers or of two synthetic fibers. Superior repellent properties, along with desirable properties of low yellowing and good durability are imparted to fabrics and fabric blends by the addition of these improved fluorochemical copolymers. They are applied to the fabric in the form of a dispersion in water or other solvent, either before, after, or during the application of other fabric treatment chemicals.

The copolymers of this invention are prepared by conventional emulsion polymerization techniques. The surfactant employed to stabilize the emulsion during its formation and during polymerization can be a cationic or non-ionic emulsifying agent or agents. The polymerization is conveniently initiated by azo initiators such as 2,2'-azobis(2-amidinopropane) dihydrochloride. These initiators are sold by E. I. du Pont de Nemours and Company, Wilmington, Del., commercially under the name of "VAZO", and by Wako Pure Industries, Ltd., Richmond, Va., under the name "V-50."

The emulsions produced are applied to textile surfaces by known methods to impart oil-, soil- and water-repellency. The copolymers are applied to the fabric or fabric blend either alone or in a mixture with other textile treatment agents or finishes. A distinguishing feature of the fluoropolymers of the present invention is their effectiveness at low application levels, low yellowing of the fabric upon curing, and high durability of the finish on the fabric.

The highly efficient copolymers discussed above are characterized in that they contain copolymerized comonomers in the following percentages by weight, relative to the total weight of the copolymers:

(a) from about 40% to about 75% of a monomer of formula I:

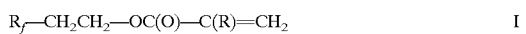

(b) from about 15% to about 55% of a monomer of formula II:

(c) from 1.5% to about 5% of a monomer of the formula III:

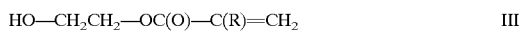

(d) from 1.5% to about 5% of a monomer of the formula IV:

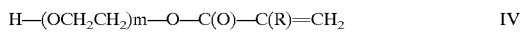

(e) from 1% to about 3% of a monomer of the formula V:

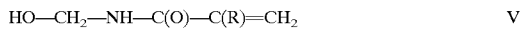

wherein $R_f$ is a straight or branched-chain perfluoroalkyl group of from 2 to about 20 carbon atoms, each R is independently H or $CH_3$; $R_2$ is an alkyl chain from 2 to about 18 carbon atoms; and m is 2 to about 10. The comonomers are combined in proportion within their designated ranges to add up to 100% by weight.

While the majority of the fluoropolymer repellents described in the literature today contain both a perfluoroalkyl (meth)acrylate and a long-chain alkyl (meth)acrylate, traditionally the ratio of these two monomers has been 75–60% fluoromonomer to 15–30% alkyl monomer. With the proportion of monomers in the present invention as described above, a highly durable repellent finish may be developed using only about a 50/50 ratio of these two monomers, greatly increasing fluorine efficiency. The high durability and repellency is obtained through a careful balance of monomers, specifically the incorporation of the three cross-linking monomers (c), (d) and (e), in spite of the reduction or removal of a vinylidene chloride component. This invention discloses the surprising benefits to be obtained using all three monomers (c), (d) or (e) in the proportions described above in combination with the elimination or reduction of the amount of vinylidene chloride.

Preferably monomer (a) of formula I is a perfluoroalkylethyl acrylate with a perfluoroalkyl carbon chain length distribution by weight of about 50% of 8-carbon, about 30% of 10-carbon, about 10% of 12-carbon, and with smaller percentages of 6-carbon and 14-carbon and longer chain lengths. The proportion of monomer (a) of formula I is at least about 40% relative to the total weight of copolymer. If it is present in lower amounts, the polymer becomes more hydrophilic and the oil- and water-repellency drops off to an undesirable level. The proportion of monomer (a) of formula I is less than about 75%. If it is present in higher amounts, the polymer is no longer cost effective. The proportion of monomer (a) of formula I in the copolymer is preferably between about 40% and about 60% by weight for application to synthetic fabrics, and from about 55% to about 75% by weight for application to cotton fabrics. These ranges are preferred for the best durability of oil-, water- and soil repellent properties in currently envisioned applications of treatment of fabrics and fabric blends. Other proportions may be more desirable for other applications.

The required monomer (b) of formula II in the present invention is one or a mixture of alkyl (meth)acrylates having chain lengths of 2 to 18 carbons, preferably 12 to 18 carbons. These are added to the polymerization in proportions from 15% to about 55%. Preferably the proportion of monomer (b) in the copolymer is between about 35% and about 55% by weight for application to synthetic fabrics, and about 15% to about 35% by weight for application to cotton fabrics. As used herein, "alkyl" refers to linear, branched-chain and cyclic alkyl groups. Examples of such monomers include ethyl acrylate, propyl acrylate, butyl acrylate, cyclohexyl acrylate, stearyl acrylate, lauryl acrylate, stearyl methacrylate, lauryl methacrylate, 2-ethylhexyl acrylate, and isodecyl acrylate. Of the foregoing, stearyl acrylate and stearyl methacrylate are most preferred.

It has found that by incorporating the three monomers (c), (d) and (e) of formulas II, IV and V into the fluorinated polymer, the amount of vinylidene chloride can be sharply decreased or eliminated while achieving comparable repellency and durability. Monomer (c) is a hydroxyethyl (meth) acrylate. Preferably it is hydroxyethyl methacrylate (HEMA). Monomer (d) is an ethoxylated (meth)acrylate wherein the number of ethoxy groups is between 2 and 10. Between 5 and 10 ethoxy groups are preferred. Monomer (e) is N-methylol acrylamide or methacrylamide. N-methylol acrylamide (MAM) is preferred.

The proportion of each of these monomers employed determines the softness of the product, the performance of the product across several substrates and the durability of the repellency properties. The proportion of each of these monomers must be at least 1.5% by weight of the copolymer to provide the necessary durability and performance attributes. The percentage by weight of monomer (c) and (d) must each be below about 5% by weight, and the percentage by weight of monomer (e) must be below about 3% by weight. The utility of incorporating these three monomers into the polymer backbone is the efficient cross-linking between the various polymer chains upon cure. The cross-linking efficiency between polymer chains is especially important when dealing with synthetic fabrics where reactive groups on the surface may be at a very low concentration. In this case the durability of the finish would arise from the polymers linking around the individual fibers and thus be physically trapped rather than chemically bound to the fibers.

One of the major advantages of the inventive composition is its flexibility for a variety of uses. Its hydrophobic and oleophobic properties on a wide range of fabrics can be varied for different applications by simply varying the relative amounts of monomers (a) (b) (c) (d) and (e), while still maintaining its properties as a durable, low yellowing repellent.

Optionally, the copolymer composition can also contain up to about 9.8% by weight of monomer (f); i.e., vinylidene chloride (formula VI) or vinyl acetate (formula VII), or a mixture thereof:

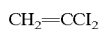    VI

    VII

The addition of a relatively small amount of vinylidene chloride or vinyl acetate may be desirable to improve the compatibility of the copolymer with the fabric substrate, or to reduce overall costs. Preferably the amount of monomer (f) is below about 8% by weight, more preferably below about 5% by weight. To have a noticeable effect on compatibility, monomer (f) is present in a proportion of at least about 1%.

The repellent composition applied to the fabric may optionally contain a blocked isocyanate to promote durability, either as part of the copolymer or added after copolymerization. It has been found that the fabric's hand is preferably soft if the blocked isocyanate is part of the copolymer. The desirability of adding a blocked isocyanate depends on the particular application for the copolymer. For most of the presently envisioned applications, it does not need to be present to achieve satisfactory cross-linking between chains or bonding to the fibers. However, for optimum durability in the application of the copolymer of this invention to cotton fabrics, it is preferred that up to 2% by weight be added. To have a noticeable effect on durability, it must be present in a proportion of at least about 1%. Optionally therefore, the copolymer composition may also contain up to about 2% by weight of monomer (g), a blocked isocyanate.

"Blocked isocyanate" is used herein to mean the reaction products of an isocyanate and a blocking agent, wherein the blocking agent is removable from the isocyanate under the thermal conditions employed upon curing a fabric treated with a compound containing the blocked isocyanate group. These are frequently used to add durability to certain properties of treated fabrics. Conventional blocking agents include aryl alcohols, alkanone oximes, aryl thioles, organic active hydrogen compounds, sodium bisulfite and hydroxylamine. Preferred blocking agents are alkanone oximes (ketoximes), which can be de-blocked at a relatively low temperature such as used during a typical fabric curing process. Particularly preferred is butanone oxime.

Many isocyanates are suitable for use in preparation of the blocked isocyanate including linear or branched isocyanates, aromatic isocyanates, and cyclic isocyanates. Preferred are linear or branches isocyanates. Especially preferred for use as the blocked isocyanate herein is the monomer, 2-(0-[1'-methyl-propylideneamino]carboxyamino)ethyl methacrylate, of formula VIII

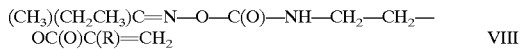    VIII wherein R is H or $CH_3$.

The present invention further comprises a method of treating fabrics or fabric blends comprising application to the surface of the fabric or fabric blend of an effective amount of a copolymer composition as described above, and the fabric or fabric blend so treated. The copolymers are applied to the fabric or blended fabric to be treated either alone or in a mixture with other textile treatment agents or finishes. The copolymers are generally applied to textile fabrics by spraying, dipping, padding, or other well-known methods. After excess liquid has been removed, for example by squeeze rolls, the treated fabric is dried and then cured by heating, for example, from 100° C. to 190° C., for at least 30 seconds, typically 60–180 seconds. Such curing enhances oil-, water- and soil repellency and durability of the repellency. While these curing conditions are typical, some commercial apparatus may operate outside these ranges because of its specific design features. The treated fabric has a fluorine content of from about 0.05% to about 0.5% by weight.

The present invention further comprises a fabric or fabric blend which has been treated to impart oil-and water-repellent properties thereto by application of an effective amount of a copolymer as described above. The treated fabric has a fluorine content of from about 0.05% to about 0.5% by weight. The treated fabric has superior oil-and water-repellencies, especially in terms of durability after washing, and decreased yellowing of the fabric.

The copolymers and method of the present invention are useful to enhance oil-, water- and soil-repellency of fabrics and fabric blends even after repeated laundering. The repellency property is durable, and is especially effective for synthetic fabrics. The treated fabrics and fabric blends of the present invention are useful in a variety of applications such as for textiles, clothing, furnishings and the like. The copolymers of the present invention are advantageous in that they give highly durable, low yellowing repellent finishes over a wide range of fabrics or fabric blends. The inventive compositions are made at lower materials cost than the current acrylate copolymers.

TEST METHODS

The following tests were employed in evaluating the examples herein.
Fabric Treatment
An aqueous bath containing 1.5% of the fluorinated product was used in all cases. The fabric was padded with the bath.
A. 100% Polyester and Blended Fabric
A wetting agent was also included in the bath at 0.2%. The fabric was cured at approximately 160° C. for 2–3 minutes. The fabric was allowed to "rest" after treatment and cure.
B. 100% Cotton Fabric
In most cases a resin such as Permafresh MSC was used. However in Example 6 and comparative Example B a wetting agent was found useful when used with a blocked isocyanate resin. The fabric was cured after treatment at approximately 150° C. for 2–3 minutes. The fabric was allowed to "rest" after treatment and cure.

Water Repellency

The water repellency of a treated substrate was measured according to the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. A higher water repellency rating indicates a better resistance of a finished substrate to staining by water-based substances. The composition of standard test liquids is shown in the following table.

TABLE 1

Standard Test Liquids

| Water Repellency Rating Number | Composition, Vol % | |
| --- | --- | --- |
| | Isopropyl Alcohol | Distilled Water |
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |

Water Repellency—Spray Rating

Water repellency can be further tested by utilizing the spray test method. The treated fabric samples were tested for water repellency by following the AATCC standard Test Method No. 22-1996, conducted as follows. A fabric sample, treated with an aqueous dispersion of polymer as previously described, is conditioned for a minimum of 2 hours at 23° C.+20% relative humidity and 65° C.+10% relative humidity. The fabric sample is securely fastened on a plastic/metal embroidery hoop such that the fabric is wrinkle-free. The hoop is placed on the testing stand so that the fabric is facing up. Then 250 mL of water is poured into the testing funnel allowing the water to spray onto the fabric surface. Once the water has run through the funnel the hoop is rapped twice against the edge of a solid object with the fabric facing down. The spotted or wetted surface is compared with the AATCC standards found in the AATCC Technical Manual. The more wet the surface, the lower the number and the poorer the repellency. A 100 denotes no wetting, a 90 denotes slight wetting (three small spots), an 80 denotes wetting signified by several (10) spots at the spray points, a 70 denotes partial wetting of the upper fabric surface, a 50 denotes wetting of the entire upper fabric surface, a 0 denotes complete wetting of the lower and upper fabric surface.

Oil Repellency

The treated fabric samples were tested for oil repellency by a modification of AATCC standard Test Method No. 118, conducted as follows. A fabric sample, treated with an aqueous dispersion of polymer as previously described, is conditioned for a minimum of 2 hours at 23° C.+20% relative humidity and 65° C.+10% relative humidity. A series of organic liquids, identified below in Table 2, are then applied dropwise to is the fabric samples. Beginning with the lowest numbered test liquid (Repellency Rating No. 1), one drop (approximately 5 mm in diameter or 0.05 mL volume) is placed on each of three locations at least 5 mm apart. The drops are observed for 30 seconds. If, at the end of this period, two of the three drops are still spherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs.

The oil repellency rating of the fabric is the highest numbered test liquid for which two of the three drops remained spherical to hemispherical, with no wicking for 30 seconds. In general, treated fabrics with a rating of 5 or more are considered good to excellent; fabrics having a rating of one or greater can be used in certain applications.

TABLE 2

Oil Repellency Test Liquids

| Oil Repellency Rating Number | Test Solution |
| --- | --- |
| 1 | NUJOL Purified Mineral Oil |
| 2 | 65/35 Nujol/n-hexadecane by volume at 21° C. |
| 3 | n-hexadecane |
| 5 | n-dodecane |
| 6 | n-decane |

Note: NUJOL is a trademark of Plough, Inc., for a mineral oil having a Saybolt viscosity of 360/390 at 38° C. and a specific gravity of 0.880/0.900 at 15° C.

Yellowing of Fabric

The yellowing of a treated substrate upon cure was measured according to a DuPont Technical Laboratory Method. The method is as follows; a 2 inch by 2 inch (5.1 cm by 5.1 cm) piece of white polyester or cotton fabric is submerged into a neat solution of the product, removed and wrung out. The piece of fabric is then laid on a screen and cured in the oven at 180° C. for 2–5 minutes. As a control, a piece of fabric is submerged in water and cured at 180° C. The rating of the yellowing is done visually, the samples are compared and rated against themselves and the untreated cured substrate. A piece that does not yellow is rated as a 1–2; a piece that yellows slightly is rated as a 3–4; a piece that yellows and becomes slightly tan is rated as a 5–6; a piece that becomes yellow brown is rated as a 7–8; and finally a piece that becomes brown is rated as a 9–10.

Laundering Procedure

The fabric samples were laundered according to the U.S. Home Laundering Method outlined in the TEFLON Global Specifications and Quality Control Tests information packet. Fabric samples are loaded into a KENMORE automatic washer with a ballast load to give a total dry load of 4 lb. (1.0 kg). A commercial detergent is added (AATCC 1993 Standard Reference Detergent WOB) and the washer is filled to a high water level with warm water (105° F.)(41□C.). The samples and ballast are washed a designated number of times (5HW=5 washes, 10HW=10 washes, etc.) using a 12-minute normal wash cycle followed by rinse and spin cycles. The samples are not dried between wash cycles.

After washing is complete, the wet fabric samples and ballast are transferred to a KENMORE automatic dryer and dried for 45 minutes at the high/cotton setting to achieve a vent temperature of 155–160° F. (68–71° C.).

EXAMPLES

The following preparative examples were used in evaluating the properties of fabric and fabric blends treated with the inventive copolymers and comparative copolymers.

Example 1

A four-necked flask fitted with a stirrer, thermocouple thermometer, and a dry ice condenser was charged with (a) 60 g (44 parts by weight) of fluoromonomer having the formula:

$$CF_3CF_2(CF_2)_xC_2H_4OC(O)-C(H)=CH_2,$$

wherein x=6, 8, 10, 12, 14, 16, and 18 in the respective relative amounts of about 3%, 50%, 31%, 10%, 3% 2% and 1%, said monomer having a weight average molecular weight of 569; (b) 60 g (44 parts by weight) of stearyl methacrylate; (c) ; 2.7 g (2 parts by weight) 2-hydroxyethylmethacrylate; (d) 2.7 g (2 parts by weight) of poly(oxyethylene)7 methacrylate, (e) 2.7 g (2 parts by weight) of N-methylol-acrylamide (f) 10 g (7 parts by weight) of vinylidene chloride; 0.2 g of dodecyl mercaptan, 25 g hexylene glycol, 5.3% (by weight of total monomer) of Tergital 15-5-20 available from Union Carbide, Danbury, Conn., 0.4% (by weight of total monomer) of Ethoquad 18/25 available from Akzo Nobel, McCook, Ill., and 200 g of water. The charge was purged with nitrogen at 40° C. for 30 minutes. 0.9 g of "VAZO" 52 WSP was then added to initiate polymerization and the charge was stirred for 8 hours at 55° C. under nitrogen. The resulting polymer latex weighed 388 g with solids content of 33%. A fabric of 100% woven polyester was treated with the polymer as previously described and tested for repellency using the test methods detailed above, and retested after several laundry cycles. The resulting data are in Table 3.

Example 2

The process of Example 1 was repeated using the same monomers and other ingredients, but the following amounts were changed: (a) 60 g of fluoromonomer, (b) 60 g of stearyl methacrylate; (c) 2.5 g of 2-hydroxyethylmethacrylate; (d) 2.5 g of poly(oxyethylene)7 methacrylate, (e) 2.5 g of N-methylolacrylamide and 0.7 g of "VAZO" 52 WSP. No vinylidene chloride was added. The resulting polymer latex weighed 383 g and had a solids content of 31%. A fabric of 100% woven polyester was treated with the polymer as previously described and tested for repellency using the test methods detailed above, and retested after several laundry cycles. The resulting data are in Table 3.

Comparative Example A

This is an example of a commercially available fluoroacrylate containing greater than 10% by weight of vinylidene chloride and a ratio of fluoromonomer/alkylmonomer of about 70/30 as disclosed in U.S. Pat. No. 4,742,140. A fabric of 100% woven polyester was treated with the polymer as previously described and tested for repellency using the test methods detailed above, and retested after several laundry cycles. The resulting data are in Table 3.

"HW" in the table refers to the number of home washes or laundry cycles carried out on the fabric using the laundering procedure detailed above.

TABLE 3

Test of Fluorochemicals on 100% Polyester

|  | Oil Repellency | | Water Repellency | | Spray Rating | |
|---|---|---|---|---|---|---|
|  | Initial | 15 HW | Initial | 15 HW | Initial | 15 HW |
| Example 1 | 6 | 5 | 8 | 8 | 100 | 90 |
| Example 2 | 6 | 5 | 8 | 8 | 100 | 100 |
| Comparative Example A | 6 | 3 | 8 | 7 | 100 | 90 |

In the above tests, the composition of Example 2 tested better than that of Example 1, and Comparative Example A, showing that excellent and durable repellency is obtained with either a diminished amount of vinylidene chloride or with none at all by using the compositions discussed in this invention. As well, it is illustrated that a polymer containing a 50/50 ratio of the fluoromonomer/alkyl monomer (Examples 1, 2) out-performs a polymer with a higher concentration of the fluoromonomer (Comparative Example A).

Example 3

A four-necked flask was fitted with a stirrer, thermocouple thermometer, and a reflux condenser was charged with (a) 60 g (45 parts by weight) of the fluoromonomer of Example 1; (b) 60 g (45 parts by weight) of stearyl methacrylate;(c) 6 g (4 parts by weight) of 2-hydroxyethylmethacrylate, (d) 6 g (4 parts by weight) of poly(oxyethylene)7 methacrylate, (e) 2.4 g ( 2 parts by weight) of N-methylolacrylamide, 0.2 g of dodecyl mercaptan, 25 g of hexylene glycol, 5.3% (by weight of total monomer) of Tergital 15-5-20 available from Union Carbide, Danbury, Conn., 0.4% (by weight of total monomer) of Ethoquad 18/25 available from Akzo Nobel, McCook, Ill., and 200 g of water. The charge was purged with nitrogen at 40° C. for 30 minutes. 0.7 g of "VAZO" 52 WSP was then added to initiate polymerization and the charge was stirred for 8 hours at 55° C. under nitrogen. The resulting polymer latex weighed 360 g with 34% solids. A fabric of 100% polyester was treated with the polymer as previously described and tested for repellency using the test methods detailed above, and retested after several laundry cycles. The resulting data are in Table 4.

Example 4

A four-necked flask fitted with a stirrer, thermocouple thermometer, and a reflux condenser was charged with (a) 75 g (47 parts by weight) of a fluoromonomer having the formula

$$CF_3CF_2(CF_2)_xC_2H_4OC(O)-C(CH_3)=CH_2,$$

wherein x=2, 4, 6, 8,10, and 12, in the respective relative amounts of about 3%, 35%, 30%, 17%, 8% and 6%, said monomer having a weight average molecular weight of 543 (available from E. I. du Pont de Nemours and Co., Wilmington, Del., as "ZONYL" TM); (b) 50 g (47 parts by weight) of stearyl methacrylate; (c) 5 g (4 parts by weight) of 2-hydroxyethylmethacrylate, (d) 5 g (4 parts by weight of poly(oxyethylene)7 methacrylate, (e) 2 g ( 2 parts by weight) of N-methylolacrylamide, 0.2 g of dodecyl mercaptan, 30 g of hexylene glycol, 5.3% (by weight of total monomer) of Tergital 15-5-20 available from Union Carbide, Danbury, Conn., 0.4% (by weight of total monomer) of Ethoquad 18/25 available from Akzo Nobel, McCook, Ill., and 200 g of water. The charge was purged with nitrogen at 40° C. for 30 minutes. 0.8 g of "VAZO" 52 WSP was then added to initiate polymerization and the charge was stirred for 8 hours at 55° C. under nitrogen. The resulting polymer latex weighed 445 g with solids of 28%. A fabric of 100% polyester was treated with the polymer as previously described and tested for repellency using the test methods detailed above, and retested after several laundry cycles. The resulting data are in Table 4.

Example 5

Example 4 was repeated using the fluoromonomer of Example 1. The resulting polymer latex weighed 430 g with solids of 30%. A fabric of 100% polyester was treated with the polymer as previously described and tested for repellency using the test methods detailed above, and retested after several laundry cycles. The resulting data are in Table 4.

Example 6

A four-necked flask fitted with a stirrer, thermocouple thermometer, and a reflux condenser was charged with (a) 91 g (69 parts by weight) of the fluoromonomer of Example 1; (b) 24 g (18 parts by weight) of stearyl methacrylate; (c) 2.3 g (2 parts by weight) 2-hydroxyethyl methacrylate, (d) 2.7 g (2 parts by weight) of poly(oxyethylene)$_{10}$acrylate, (e) 2.7 g (2 parts by weight) of N-methylolacrylamide; (g) 2 g (1 part by weight) of 2-2-(0-[1'-methyl-propylideneamino] carboxyamino)ethyl methacrylate (containing a blocked iso cyanate), 0.3 g of dodecyl mercaptan, 30 g of hexylene glycol, 5.3% (by weight of total monomer) of Tergital 15-5-20 available from Union Carbide, Danbury, Conn., 0.4% (by weight of total monomer) of Ethoquad 18/25 available from Akzo Nobel, McCook, Ill., and 200 g of water. The charge was purged with nitrogen at 40° C. for 30 minutes. 0.8 g of "VAZO" 52 WSP was then added to initiate polymerization and the charge was stirred for 8 hours at 55° C. under nitrogen. The resulting polymer latex weighed 511 g with solids of 24.6%. A fabric of 100% polyester was treated with the polymer as previously described and tested for repellency using the test methods detailed above, and retested after several laundry cycles. The resulting data are in Table 4.

TABLE 4

Test of Fluorochemicals on 100% Polyester (1)

|  | Oil Repellency | | Water Repellency | | Spray Rating | |
| --- | --- | --- | --- | --- | --- | --- |
|  | Initial | 15 HW* | Initial | 15 HW | Initial | 15 HW |
| Example 3 | 6 | 6 | 8 | 8 | 100 | 100 |
| Example 4 | 5 | 5 | 8 | 8 | 100 | 100 |
| Example 5 | 6 | 5 | 8 | 8 | 100 | 100 |
| Example 6 | 6 | 6 | 8 | 8 | 100 | 100 |
| Comparative Example A | 6 | 3 | 8 | 7 | 100 | 90 |

*number of laundry cycles using procedure previously described

Examples 3 and 6 performed the best of the four examples with respect to durability. All of the examples 3–6 shown exhibited better durability than the comparative example A. Again, it is illustrated that polymers containing less fluoromonomer than traditional repellents (Examples 3–5) are able to perform well with good durability. As well it is illustrated that a durability of a finish is increased with the incorporation of a blocked isocyanate into the polymer backbone (Example 6).

To illustrate the durability of these types of products across several types of fabrics, a second type of polyester was tested using the polymers of Examples 3–6 and comparative Example A. This fabric was a taffeta polyester woven of smaller yarns and having a sheen on the surface. Resulting data are in Table 5.

TABLE 5

Test of Fluorochemicals on 100% Polyester (2)

|  | Oil Repellency | | Water Repellency | | Spray Rating | |
| --- | --- | --- | --- | --- | --- | --- |
|  | Initial | 15 HW* | Initial | 15 HW | Initial | 15 HW |
| Example 3 | 6 | 5 | 8 | 8 | 100 | 100 |
| Example 4 | 5 | 3 | 8 | 6 | 100 | 70 |
| Example 5 | 6 | 5 | 8 | 6 | 100 | 70 |
| Example 6 | 6 | 4 | 8 | 7 | 100 | 90 |
| Comparative Example A | 6 | 0 | 8 | 5 | 100 | 50 |

*number of laundry cycles using procedure previously described

The durability of the fabric treatment is affected by the fabric: however both example 3 and 6 were to be more durable than the other samples shown with respect to repellency after washing. All Examples 3–6 demonstrated better durability of repellency than Comparative Example A. The versatility of these products is shown here, these types of fabric treatments can be utilized on many different fabric styles.

Comparative Example B

This is an example of a fluorinated polyurethane containing a blocked polyisocyanate and no vinylidene chloride, commercially available as "ZONYL" 8787 from E. I. du Pont de Nemours and Company, Wilmington, Del.

The fabric used in the following test was a 100% cotton fabric treated as previously described with the fluorochemicals of Examples 3, 6 and Comparative Example B. Repellency was tested using the test methods detailed above, and retested after several laundry cycles. Results are shown in Table 6 below.

TABLE 6

Test of Fluorochemicals on 100% Cotton

|  | Oil Repellency | | Water Repellency | | Spray Rating | |
| --- | --- | --- | --- | --- | --- | --- |
|  | Initial | 10 HW* | Initial | 10 HW | Initial | 10 HW |
| Example 3 | 6 | 4 | 8 | 5 | 100 | 90 |
| Example 6 | 6 | 5 | 8 | 6 | 100 | 100 |
| Comparative Example B | 6 | 4 | 8 | 4 | 100 | 70 |

*number of laundry cycles using procedure previously described.

Example 6 performed the best on cotton. The durability of both examples 3 and 6 were affected by the hydrophilic properties of cotton. However, the polymer containing the blocked isocyanate in the backbone (Example 6) performed better and retained its performance slightly better. This may indicate that the blocked isocyanate along the backbone increases the ability of the polymer chains to cross link and attach to the surface of the cotton more readily.

Example 7

The fabric used in the following test was a 100% white cotton fabric treated as previously described with fluorochemicals of Examples 1, 2, 3, 4, 5, 6 and Comparative Examples A and B. Yellowing was tested using the test method previously described. Results of the product yellowing upon cure are shown in Table 7 below.

TABLE 7

Test of Fluorochemicals on 100% Cotton

| | Degree of yellowing (color) on fabric | |
|---|---|---|
| | Initial | After Cure |
| Example 1 | 1 | 5 |
| Example 2 | 1 | 3 |
| Example 3 | 1 | 1 |
| Example 4 | 1 | 1 |
| Example 5 | 1 | 3 |
| Example 6 | 1 | 5 |
| Comparative Example A | 1 | 10 |
| Comparative Example B | 1 | 8 |

The comparative examples A and B yellowed much more than the examples 1–6 of the present invention. This data illustrated that the reduction or exclusion of vinylidene chloride from the polymer of Examples 1–6 drastically reduced the yellowing effect upon curing. The yellowing of Comparative Example B having no vinylidene chloride present was due to the presence of the blocked isocyanate component. The reduction in color is important especially when dealing with the finishing of white or light colored fabrics. Again this data illustrated how versatile these finishes are across many different fabrics and colors of fabrics.

What is claimed is:

1. A copolymer comprising monomers copolymerized in the following percentages by weight:

(a) from about 40% to about 75% of a monomer of formula I:

$$R_f\text{—}CH_2CH_2\text{—}OC(O)\text{—}C(R)\text{=}CH_2 \quad\quad I$$

(b) from about 15% to about 55% of a monomer of formula II:

$$R_2\text{—}OC(O)\text{—}C(R)\text{=}CH_2 \quad\quad II$$

(c) from 1.5% to about 5% of a monomer of the formula III:

$$HO\text{—}CH_2CH_2\text{—}OC(O)\text{—}C(R)\text{=}CH_2 \quad\quad III$$

(d) from 1.5% to about 5% of a monomer of the formula IV:

$$H\text{—}(OCH_2CH_2)_m\text{—}O\text{—}C(O)\text{—}C(R)\text{=}CH_2 \quad\quad IV$$

(e) from 1% to about 3% of a monomer of the formula V:

$$HO\text{—}CH_2\text{—}NH\text{—}C(O)\text{—}C(R)\text{=}CH_2 \quad\quad V$$

(f) from 0% to about to about 9.8% of vinylidene chloride, vinyl acetate, or a mixture thereof
    (g) from 0% to about 2% of a blocked isocyanate,
wherein $R_f$ is a straight or branched-chain perfluoroalkyl group of from 2 to about 20 carbon atoms, each R is independently H or $CH_3$; $R_2$ is an alkyl chain from 2 to about 18 carbon atoms; and m is 2 to about 10.

2. The copolymer composition of claim 1 wherein $R_f$ in monomer (a) of formula I is:

$$CF_3CF_2(CF_2)_xC_2H_4OC(O)\text{—}C(H)\text{=}CH_2,$$

wherein x=6, 8, 10, 12, 14, 16, and 18 in the respective relative amounts of about 3%, 50%, 31%, 10%, 3% 2% and 1%, and said monomer has a weight average molecular weight of about 569.

3. The copolymer composition of claim 1 wherein monomer (b) is stearyl (meth)acrylate.

4. The copolymer composition of claim 1 wherein monomer (c) is hydroxyethyl methacrylate.

5. The copolymer composition of claim 1 wherein for monomer (d) m is between about 5 and about 10.

6. The copolymer composition of claim 1 wherein monomer (e) is N-methylolacrylamide.

7. The composition of claim 1 wherein the blocked isocyanate has the formula $$(CH_3)(CH_2CH_3)C\text{=}N\text{—}O\text{—}C(O)\text{—}NH\text{—}CH_2\text{—}CH_2\text{—}OC(O)C(R)\text{=}CH_2$$

wherein R is H or $CH_3$.

8. A method of treating a fabric or fabric blend to impart oil and water-repellency comprising application to the surface of the fabric or fabric blend of a dispersion of a copolymer comprising monomers copolymerized in the following percentages by weight:

(a) from about 40% to about 75% of a monomer of formula I:

$$R_f\text{—}CH_2CH_2\text{—}OC(O)\text{—}C(R)\text{=}CH_2 \quad\quad I$$

(b) from about 15% to about 55% of a monomer of formula II:

$$R_2\text{—}OC(O)\text{—}C(R)\text{=}CH_2 \quad\quad II$$

(c) from 1.5% to about 5% of a monomer of the formula III:

$$HO\text{—}CH_2CH_2\text{—}OC(O)\text{—}C(R)\text{=}CH_2 \quad\quad III$$

(d) from 1.5% to about 5% of a monomer of the formula IV:

$$H\text{—}(OCH_2CH_2)_m\text{—}O\text{—}C(O)\text{—}C(R)\text{=}CH_2 \quad\quad IV$$

(e) from 1% to about 3% of a monomer of the formula V:

$$HO\text{—}CH_2\text{—}NH\text{—}C(O)\text{—}C(R)\text{=}CH_2 \quad\quad V$$

(h) from 0% to about to about 9.8% of vinylidene chloride, vinyl acetate, or a mixture thereof
    (i) from 0% to about 2% of a blocked isocyanate,
wherein $R_f$ is a straight or branched-chain perfluoroalkyl group of from 2 to about 20 carbon atoms, each R is independently H or $CH_3$; $R_2$ is an alkyl chain from 2 to about 18 carbon atoms; and m is 2 to about 10.

9. A fabric or fabric blend having applied to its surface a copolymer of claim 1.

10. The fabric or fabric blend of claim 9 having a fluorine content of from about 0.05% to about 0.5% by weight.

11. The fabric or fabric blend of claim 10 comprising cotton, rayon, silk, wool, hemp, polyester, spandex, polypropylene, polyolefin, nylon, aramid or poly(trimethylene terephthalate).

* * * * *

UNITED STATES PATENT AND TRADEMARK OFFICE
CERTIFICATE OF CORRECTION

PATENT NO.   : 6,479,605 B1
DATED        : November 12, 2002
INVENTOR(S)  : Justine Gabrielle Franchina It is certified that error appears in the above-identified patent and that said Letters Patent is hereby corrected as shown below:

Column 13,
Line 61, "(f) from 0% to about to about 9.8%..." should read
-- (f) from 0% to about 9.8%... --

Signed and Sealed this

Eighth Day of April, 2003

JAMES E. ROGAN
*Director of the United States Patent and Trademark Office*